Dec. 24, 1957  A. CANEPA  2,817,547
EXPANSION JOINT FOR CONNECTING PIPINGS, ESPECIALLY
FOR SCAFFOLDING STRUCTURES
Filed Nov. 13, 1953
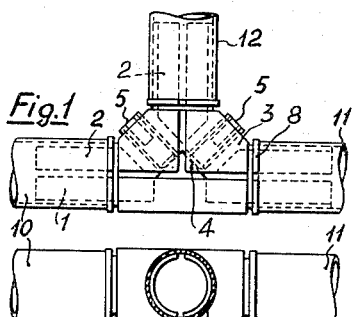
Fig.1
Fig.2
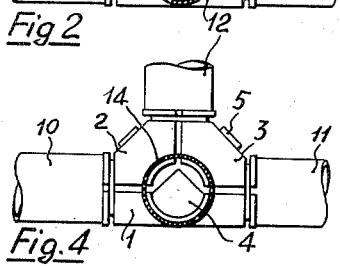
Fig.4
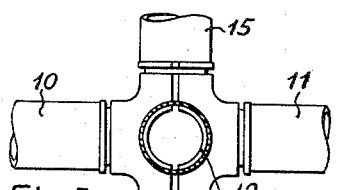
Fig.5
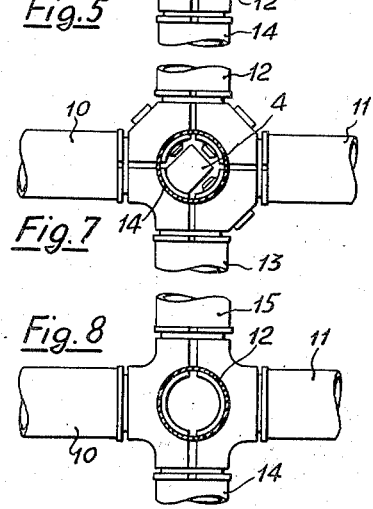
Fig.7
Fig.8
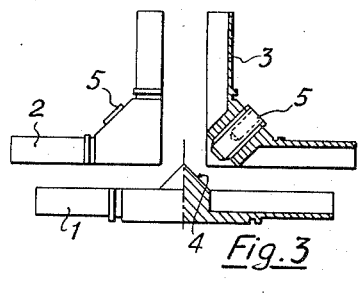
Fig.3
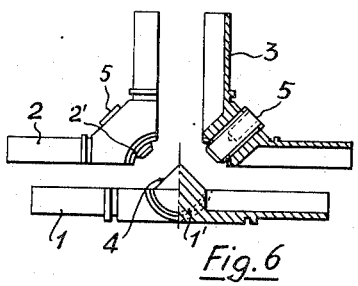
Fig.6
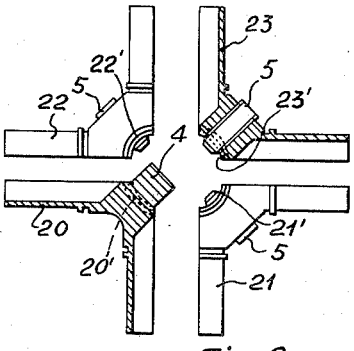
Fig.9
INVENTOR
AGOSTINO CANEPA
BY Greene, Pinales and Durr
ATTORNEY United States Patent Office 2,817,547
Patented Dec. 24, 1957

2,817,547

EXPANSION JOINT FOR CONNECTING PIPINGS, ESPECIALLY FOR SCAFFOLDING STRUCTURES

Agostino Canepa, Milan, Italy

Application November 13, 1953, Serial No. 392,011

4 Claims. (Cl. 287—54)

Conventional pipe joints comprise a central body having seats receiving the pipes which are then clamped by means of bolts and by a second element having a similar seat. Such joints are well adapted for jointing two or three pipes in a single plane, but are difficult to connect together a greater number of pipes in a plane perpendicular to the first one.

It is an object of the present invention to provide a joint that can serve for connecting from three to six pipes, positioned in the three orthogonal planes which joint is formed by a limited number of elements.

The joint is precisely characterized by the fact that it has a number of elements equal at most to the number of pipes to be connected, which elements possess a solid central portion and terminate at their ends with a tubular half portion adapted to be fitted inside the pipe to be connected and cooperating with a similar end, provided in another of said elements, so as to leave between said ends a longitudinal slot, there being provided in one of the central portions a jutting of suitable shape which serves as a countershoulder for screws provided in the other elements, so that by tightening said screws, one obtains the expansion of the tubular ends connecting the pipes thanks to the pressure exercised on their internal surfaces.

Said elements can be straight or cone-shaped. When a straight element is combined with two angular ones, it is possible to connect from three to five pipes, while through the combination of four angular elements, from four to six pipes can be jointed together.

The invention will now be described more in detail with reference to the accompanying drawing wherein there are shown three embodiments thereof and in which:

Fig. 1 and Fig. 2 represent respectively a lateral and a front view of a first embodiment of the invention of which:

Fig. 3 represents, at the left, a lateral view, and at the right, a section of the three separate elements.

Figs. 4, 5 and 6, and 7, 8, and 9 show in the same way two other embodiments of the invention.

With reference now to Figs. 1 to 3, the joint comprises three elements 1, 2 and 3. Element 1 is straight, while elements 2 and 3 are angular and can be reciprocally interchanged. Element 1 presents in its inside a jutting or abutment 4 in the form of a wedge, while elements 2 and 3 present in their central portion a threaded hole wherein can be screwed a set-screw 5, extending inwardly. Elements 1, 2 and 3 each terminate with a half pipe of analogous shape and size. Thus, by fitting the pipe lengths on said ends so that the ends of pieces 1 and 2, 1 and 3, and 2 and 3 overlap each other and by tightening the set-screws 5, the ends thereof strike the jutting, press against same, and thus cause the tubular ends of said pieces to expand outwardly so that the external surfaces thereof are held under pressure against the internal surfaces of the pipe to be joined.

The most simple case, is represented in the Figs. 1 to 3, where three pipes 10, 11 and 12 are joined, in a same plane, and where the jutting 4 presents a simple wedge shape.

In the modification of Figs. 4, 5 and 6, besides the three pipes 10, 11, and 12, all in a same plane, there are to be connected two additional pipes 14 and 15 which are coaxial and are situated in a plane perpendicular to that of the first ones. In this case element 1 presents in its center and on each side a semi-tubular extension 1', adapted to cooperate on each side with two juttings 2'—3' having the shape of a quarter of a pipe and presented by the two pieces 2 and 3, so as to obtain here too two slots, that are parallel to the centerline of the pipes perpendicular to the plane of the first mentioned three pipes. The two set-screws 5 provided on the angular pieces, cause the expansion of said juttings 1', 2', 3' as well as of the above mentioned tubular ends, so that there is obtained the jointing of the three pipes in a single plane and of the two pipes, perpendicular to the first ones and fitted on the extensions. Even in this instance then, by means of only three elements, it is possible to joint five pipes.

According to the embodiment represented in the Figs. 7 to 9, it is possible to join six pipes. In such a case, there are provided four elements 20, 21, 22 and 23, which have an angular shape. Each of these elements presents, in correspondence of its vertex, and towards the two sides, an extension 20', 21', 22' and 23' having a cross-section of a quarter of a pipe, so that by combining the four elements, there is obtained a tubular shape with two slots. In the inside of one of said elements, there is provided the usual jutting 4, which in this instance has a prismatic shape. By combining the above mentioned elements it is thus possible to joint six pipes, 10, 11, 12 and 13, all in a single plane, with two pipes 14 and 15, which are coaxial and perpendicular to the first ones. There are required only three set-screws 5 at the three vertices of elements 21, 22, 23 which press against the lateral and front surfaces of the prismatic jutting 4, thereby obtaining the expansion of all the tubular pieces and therefore applying pressure on the inside surface of the six pipes to be jointed.

To prevent the elements from becoming loose when the pipe is removed elastic retaining rings 8 are provided.

In those cases where the pressure to be obtained can be reduced, that is for instance when the coupling is to serve for joints in constructional toys, it is possible to form the coupling in one piece, presenting a central body with tubular extensions and longitudinal slots corresponding to the gap left between the heretofore described elements. Said tubular extensions have to be provided of course in one or two planes, according to whether it is desired to joint pipes in a single plane or reciprocally perpendicular.

By the system now described it is possible to connect three pipes in a same plane, by using one straight element and two angular ones; four pipes in a same plane by using four angular elements: three pipes in a single plane with one or two perpendicular ones, by using one straight element and two angular ones provided with tubular perpendicular extensions at their ends; and five or six pipes, four of which are in the same plane, and one or two perpendicular to the first ones, by using four angular elements having extensions shaped as a quarter of a circle, at one or both sides.

In this way, the number of types of elements to be stocked are very few, since the simple angular elements can be reciprocally interchanged as well as the straight elements. The coupling of the invention is especially suitable for building scaffolding structures and the like.

The constructive details may eventually vary without therefore departing from the scope of the present invention.

What I claim is:

1. In a coupling device for connecting pipes comprising in combination, at least three elements, each of said elements having at least two extending ends comprising segments of tubes, each of said segments being adapted to fit within a pipe to be joined, a first and second of said elements having their respective end segments extending at an angle to each other, each of said first and second elements comprising at least one set screw and corresponding threaded opening therefor extending towards the apex of the angle formed by said end segments, a third of said elements including an abutment in the region between the tube segments facing towards the interior thereof with respect to the tubular segments, whereby the end tubular segments of at least two different elements may be inserted into each tube to be joined and said tubes may be fixed in place by expanding the elements against the interior of the tubes by rotating said screws so that the latter press against said abutment.

2. The combination device as set forth in claim 1 wherein the first and second of said elements have two end tubular segments at substantially right angles, and the third element having two end tubular segments in substantially a straight line, the third element containing said abutment in the central portion thereof.

3. The combination as set forth in claim 2 in which each of said elements has at least three end tubular segments extending therefrom, the third end tubular segment of each of the angle members extending at an angle to the plane of the other two, the third tubular segment of the straight element extending at a right angle to the other two but in substantially the same plane as said other two tubular segments whereby when said elements are assembled at least two complementary tubular segments extend in each of at least four directions.

4. The combination as set forth in claim 1 comprising four elements each having at least two end tubular segments extending at an angle to each other, three of said elements comprising a set screw and threaded opening therefor extending toward the apex of the element, the fourth element containing an abutment extending from its apex whereby when the apexes of the four elements are assembled the set screws of the three elements point toward the abutment of the fourth element.

References Cited in the file of this patent

UNITED STATES PATENTS

| | | |
|---|---|---|
| 1,150,781 | Louden | Aug. 17, 1915 |
| 1,818,172 | Sutherland | Aug. 11, 1931 |
| 2,128,720 | Tweedale | Aug. 30, 1938 |

FOREIGN PATENTS

| | | |
|---|---|---|
| 20,648 | Great Britain | Sept. 9, 1909 |
| 421,871 | Great Britain | Jan. 1, 1935 |
| 627,989 | Great Britain | Aug. 19, 1949 |